(12) United States Patent
Feichtinger et al.

(10) Patent No.: US 6,790,254 B1
(45) Date of Patent: Sep. 14, 2004

(54) METHOD FOR CONTROLLING AND ADJUSTING THE CONCENTRATION OF A GAS COMPONENT IN A MELT AND A DEVICE FOR CARRYING OUT THE SAME

(75) Inventors: Heinrich Feichtinger, Hinteregg (CH); Irina Hucklenbroich, Bochum (DE); Gerald Stein, Essen (DE)

(73) Assignee: VSG Energie - und Schmiedetechnik GmbH, Essen (DE)

( * ) Notice: Subject to any disclaimer, the term of this patent is extended or adjusted under 35 U.S.C. 154(b) by 0 days.

(21) Appl. No.: 10/009,318

(22) PCT Filed: Feb. 15, 2001

(86) PCT No.: PCT/EP01/01671

§ 371 (c)(1),
(2), (4) Date: May 29, 2002

(87) PCT Pub. No.: WO01/68924

PCT Pub. Date: Sep. 20, 2001

(30) Foreign Application Priority Data

Mar. 16, 2000  (DE) .......................................... 100 12 837

(51) Int. Cl.[7] .............................................. C21B 13/12
(52) U.S. Cl. ........................ 75/379; 75/10.17; 75/10.45; 266/89

(58) Field of Search .......................... 75/10.1, 379–381, 75/387, 546, 10.17, 10.45; 420/128, 129, 590; 266/78, 80, 81, 82, 83, 87, 89

(56) References Cited

U.S. PATENT DOCUMENTS

| | | | |
|---|---|---|---|
| 3,754,894 A | * | 8/1973 | Saccomano et al. .......... 75/557 |
| 4,401,464 A | * | 8/1983 | Tivelius ....................... 75/377 |
| 4,619,692 A | | 10/1986 | Jachowski et al. |
| 5,158,745 A | | 10/1992 | Hasegawa et al. |
| 5,204,056 A | | 4/1993 | Hasegawa et al. |

FOREIGN PATENT DOCUMENTS

DE          25 28 588       2/1976

OTHER PUBLICATIONS

Derwent –Acc–No; 1973–63027U 1973 No Month.*

* cited by examiner

*Primary Examiner*—Melvyn Andrews
(74) *Attorney, Agent, or Firm*—Proskauer Rose LLP

(57) ABSTRACT

The invention relates to a method for producing a metal alloy, in which in a vessel at overpressure a certain desired content of an alloying constituent, which is gaseous in its normal state, is fed to said metal alloy. The method is designed such that precise addition by alloying of an alloying constituent which is gaseous per se, to a steel alloy subjected to overpressure in a pressure vessel, is made possible.

22 Claims, 2 Drawing Sheets

METHOD FOR CONTROLLING AND ADJUSTING THE CONCENTRATION OF A GAS COMPONENT IN A MELT AND A DEVICE FOR CARRYING OUT THE SAME

BACKGROUND OF THE INVENTION

The invention relates to a method for producing metal alloys with a desired concentration of a gas component relevant to their properties, in a vessel which is not entirely gas-tight, as well as a device for implementing this method. The invention relates in particular to a remelting process for producing a steel with a high content of nitrogen which content has to be able to be set precisely.

For quite some time there has been great interest in the use of steels containing nitrogen. Such materials include e.g. non-corroding austenitic alloys which apart from chromium and manganese comprise dissolved nitrogen in quantities of 0.5 to 1.5 mass %. Such steels feature an unusual combination of extreme strength and toughness in addition to exceptional corrosion resistance. Thus e.g. a steel alloy marketed under the trade name of "P900" by the applicant, said steel alloy containing 18% chromium, 18% manganese as well as 0.6–1.2 mass % nitrogen, is used for forging cap rings which meet the very exacting technical requirements for incorporation in power generators of large power stations.

New martensitic tool steels are another example of steels containing nitrogen; apart from an increased content of dissolved nitrogen, these steels also comprise hard phases in the form of precipitated nitrides and/or carbonitrides. These materials combine good hardness and wear resistance with extraordinary corrosion resistance. For example an alloy marketed under the trade name of "Cronidur" by the applicant, produced by the company "VSG Energie- und Schmiedetechnik", said alloy comprising 15% chromium, 1% molybdenum, 0.3% carbon as well as 0.38 W nitrogen has been found to be particularly resistant to corrosion wear in bearings of aircraft engines.

In the applications mentioned, the nitrogen represents the essential element of the alloy which has a deciding influence on the characteristics of the respective material. Even small deviations in concentration can cause a dramatic deterioration in the positive characteristics, e.g. in relation to toughness and the corrosion resistance. For this reason, with such steels precise control of the nitrogen content is of the utmost importance when manufacturing the alloys.

In practical application, steels of the type at issue often have to be melted at increased pressure to be able to achieve the required pressures. Thus the partial pressure of the nitrogen is of particular importance. It causes dissolution of the required quantity of nitrogen in the melt. In addition, in particular in the case of alloys where the solubility of the nitrogen reduces strongly as solidification progresses, the total pressure prevents the formation of gas pores during solidification if said total pressure is above the partial pressure of the nitrogen.

Due to the necessity of melting the steels at issue in a closed pressure vessel, it is not possible to carry out the usual process control involving repeated specimen sampling from the metal bath, and subsequent gas analysis.

In the counterpressure process according to Rashav (Rashev T.-. Big-Size Steel Bath Process for Large Scale Industrial Production of High Nitrogen Steels; Proceedings of 3$^{rd}$ Int. Conference HNS 93, Kiev, Ukraine, 14.–16.9.1993) a steel charge is inductively melted in a pressure vessel and subsequently poured into a permanent mould or a form, while the pressure is maintained. The melt is exposed to increased nitrogen pressure for an extended period so that the desired nitrogen content can find its equilibrium by a nitrogen partial pressure selected for the work temperature according to Sieverts law. However, there is a problem in this connection in that the diffusion coefficient of nitrogen in the metal phase is relatively low compared with other gases. Therefore, in many cases the desired equilibrium only occurs after comparatively long treatment times. The associated long waiting times render the production process uneconomical.

Remelting methods, in particular the electroslag refining process, play an important role in the production of alloys with a high nitrogen content. In such processes, in a first step, an alloy containing less nitrogen is made using the usual means of melt metallurgy, e.g. ladle metallurgy, at normal pressure and is then poured to form an electrode. This electrode provides the starting material for a second process step in which said electrode is remelted at increased pressure. Apart from the increase in the degree of purity which is usually attained during remelting, the remelting process makes it possible to supply nitrogen to the base material of the electrode. In this process, the slag not only serves as a heating conductor but also as a refining reaction partner. In the known adding of nitrogen by alloying, a third function of the slag, which during remelting completely covers the melt, consists of supplying the nitrogen to the melt.

According to the state of the art, adding nitrogen by alloying preferably takes place by adding materials containing nitrogen, said materials being applied onto the slag as a powder mixture or granulate mixture. There is however a problem in that in such an approach, precise adding of nitrogen by alloying according to the state of art, cannot be guaranteed.

To overcome this problem, for example U.S. Pat. No. 4,027,720 proposes the use of a composite electrode in which an alloy rich in nitrogen forms the core while an alloy with little nitrogen forms the sheath. After the remelting process, in this way an ingot of an alloy comprising the desired nitrogen content is to be obtained. Practical application has however shown that this expensive and elaborate process often produces ingots of inhomogeneous composition.

SUMMARY OF THE INVENTION

It is thus the object of the invention, starting from the above-mentioned state of the art, to create a method of the type mentioned in the introduction and to create a device which is particularly suited to such a method, which enable precise adding by alloying of an alloying constituent which is gaseous per se, to a steel alloy which is being subjected to overpressure in a pressure vessel.

According to the invention this object is met, starting with a method for producing a metal alloy in which in a vessel at overpressure a certain desired content of an alloying constituent which is gaseous in its normal state, is fed to said metal alloy, in that the gaseous alloying constituent and an inert gas are added in such quantities to the atmosphere contained in the vessel that a particular initial concentration ratio between the gaseous alloying constituent and the inert gas exists in the atmosphere;

in that the change over time in the total pressure, the change over time in the concentration of the inert gas and in the gaseous alloying constituent in the atmosphere contained in the vessel, as well as the change over time in the mean gas temperature of the atmosphere contained in the vessel, are determined;

in that taking into account the respective total pressure, the respective concentration of the inert gas, the respective concentration of the gaseous alloying constituent, as well as the respective gas temperature, the inert gas mass loss, occurring as a result of lack of tightness of the vessel, of the atmosphere contained in the vessel, is determined;

in that by means of the initial concentration ratio a theoretical mass loss of the gaseous alloying constituent in the atmosphere is determined, said mass loss being the result of lack of tightness;

in that by means of a comparison of the theoretical mass loss with the actual mass loss which is determined taking into account the respective actual concentration of the gaseous component in the atmosphere contained in the vessel, the mass fraction of the gaseous component which has made the transfer to the metal alloy is determined; and in that taking into account the mass fraction which has made the transfer to the metal alloy and the mass losses of the gaseous alloying constituent which has been lost by lack of tightness, this alloying constituent is admixed to the atmosphere contained in the vessel for such a period of time and in such quantities that after completion of the process, the metal alloy has the desired content of the gaseous alloying constituent.

The method according to the invention makes it possible for the first time to determine on an ongoing basis the materials transfer of a gas component relevant to the quality of a metal alloy to the metal bath during the melting or remelting process in a vessel which is not completely gas-tight. In this way it becomes possible to produce with high precision a material with a desired concentration of the relevant gaseous alloying constituent. The excellent accuracy with which the transfer of the gaseous constituent to the metal alloy can be controlled with application of the method according to the invention, results in an even, homogenous distribution of the alloying constituent absorbed into the metal alloy.

In relation to the preferred field of application of the invention, namely the production of highly nitrogenised steels, for which production with equal preference the pressure-electroslag refining process is used, this means among other things, that an ingot correspondingly produced from the metal alloy, has an even nitrogen concentration profile along its longitudinal axis. If required, the nitrogen, corresponding to the permeability of the slag, can be alloyed with the maximum nitrogen able to be fed in from the atmosphere at the working conditions of the plant. In this way the addition of nitrogen via solid additives containing nitrogen, said addition often being problematic, can be reduced to a minimum or can be done without entirely.

The method according to the invention is in particular suitable for implementation in a vessel which is not completely gas-tight. Due to the size and complexity of such vessels it is almost impossible in practical application, to guarantee constant tightness during operation. At each of the many flanges, valves and connections required for supplying materials to the vessel, there is a danger of gas escaping. Due to the fact that according to the invention the mass fractions of the inert gas and the relevant gaseous alloying constituent which are lost from the vessel, are registered, an exact assessment of the balance of the quantity of the materials which have been supplied to the metal alloy can be carried out.

The method according to the invention can be used with various electrothermal pressure melting processes where the melt after nitriding is poured into a permanent mould or form. However, the method is used to particular advantage in electrothermal remelting methods where the melting process takes place more or less remotely from the solution equilibrium of the nitrogen between the metal phase and the gas phase.

According to the invention, a device particularly suitable for carrying out the method comprises: a vessel for containing an atmosphere and a metal alloy at overpressure; a heating device by means of which a melt can be generated from the metal alloy; a metering device for feeding into the vessel an alloying constituent which in its normal state is gaseous; a metering device for feeding into the vessel an inert gas; a pressure sensor for registering the total pressure of the atmosphere contained in the vessel; a temperature sensor for registering the temperature of the atmosphere in at least one location; a device for determining the concentrations of the inert gas and the gaseous alloying constituent in the atmosphere contained in the vessel; an evaluation unit which evaluates the total pressure, the temperature of the atmosphere and the concentrations of the inert gas and the gaseous alloying constituent; and a control device which controls the metering of the inert gas and the gaseous alloying constituent depending on the result of the evaluation of the evaluation device.

BRIEF DESCRIPTION OF THE DRAWINGS

Advantageous embodiments of the method according to the invention and the device according to the invention are provided in the dependent claims and result from the following more detailed explanations of embodiments. The following are diagrammatically shown:

DETAILED DESCRIPTION OF THE INVENTION

Figure 1:
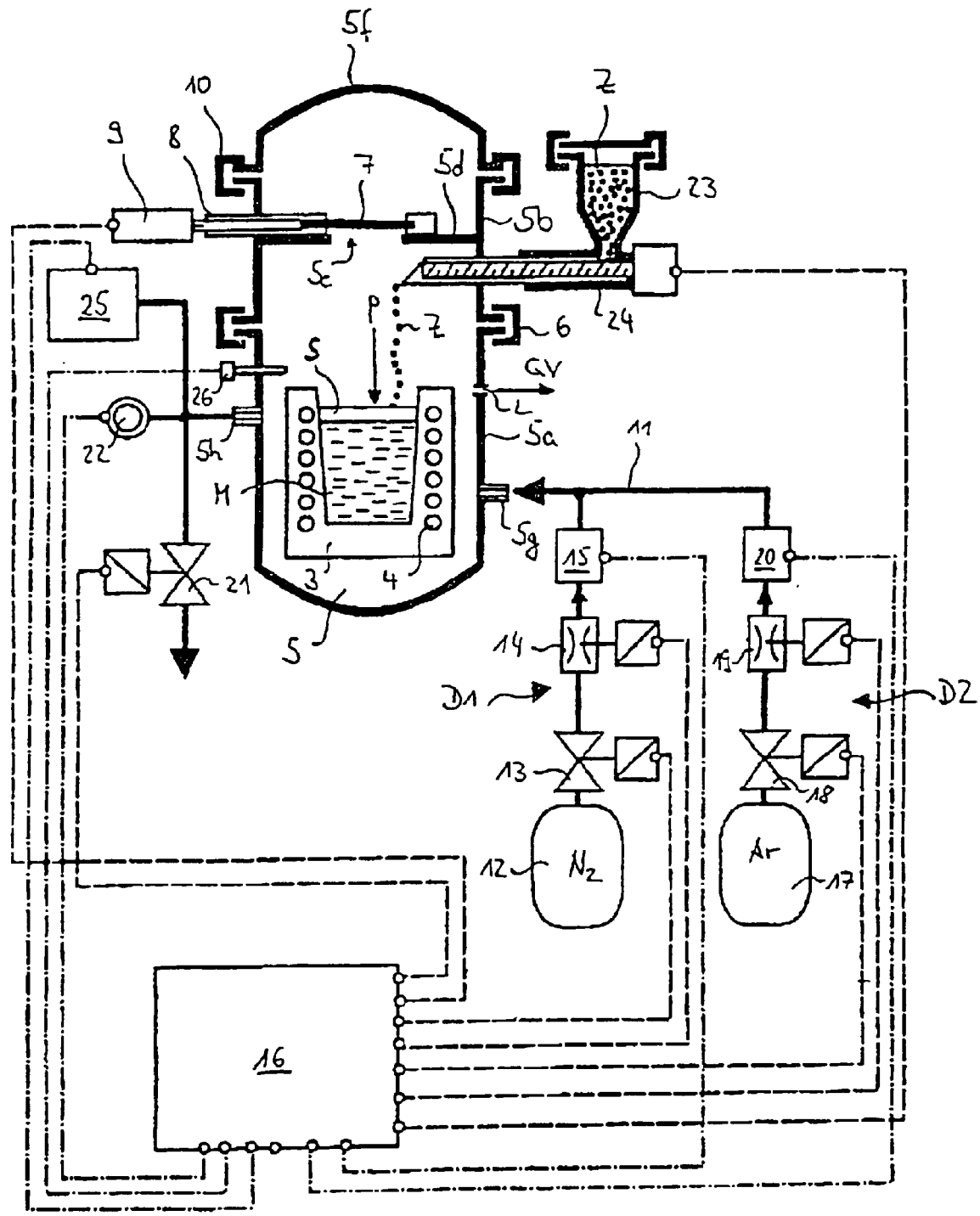
FIG. 1 a device for controlling the nitrogen transfer during melting of alloys comprising nitrogen, in a pressure induction furnace.

FIG. 1 shows an example of a device according to the invention in combination with a pressure induction furnace as e.g. described by Rashev. According to the "counterpressure smelting process" by Rashev, the liquid metal melt M is contained in an induction crucible 3 which is heated by an induction coil 4.

The crucible arrangement is arranged in the lower part 5a of a pressure vessel 5 onto which the middle part 5b of the pressure vessel 5 is placed via a flange by means of a pressaround ring 6. Said middle part 5b comprises a horizontal partition wall 5d comprising a central aperture 5e. A valve plate 7 is provided for pressure-proof closing of this aperture 5e. Movement of said valve plate 7 is via a movement mechanism 8 as well as by an electrically controllable actuator 9. The top part 5f of the pressure vessel 5 is placed onto the middle part 5b of the pressure vessel 5 via a flange by means of a pressaround ring 10.

For casting, the top part 5f can be replaced for example by a pressure-proof casting chamber (not shown in the drawing). This chamber comprises a permanent mould or form into which the melt can be fed via an ascension pipe, as a result of the action of a pressure gradient. By way of a connection 5g and a connection pipe 11, the pressure vessel 5 is connected to two metering devices D1, D2 by way of which various gases are fed to the atmosphere contained in the pressure vessel 5. Thus the first metering device D1 is used for the metered addition of gaseous nitrogen, while inert gas, for example argon, is fed to the pressure vessel 5 via the metering device D2.

To this effect the first metering device D1 comprises: a pressure reservoir 12 whose connection can be closed by means of a controllable valve 13; a motorised flow throttle 14 by way of which the volume flow flowing from the pressure reservoir can be regulated; and a mass flow meter 15 which registers the nitrogen volume flow entering the connection pipe 11 and which sends a respective measuring signal to an evaluation and control device 16. The control inputs of the valve 13 and of the flow throttle 14 are connected to control outputs of the evaluation and control device 16. As soon as the desired quantity of nitrogen has streamed in, the evaluation and control device 16 issues a signal for closing the valve 13.

The metering device D2 is constructed in the same way. It comprises: a pressure reservoir 17; a controllable valve 18, which if necessary closes off the connection of the pressure reservoir 17; a motorised controllable flow throttle 19 as well as a mass flow meter 20 which, like the mass flow meter 15, is connected to the evaluation and control device 16.

By way of a connection 5h, excessive pressure can be released from the pressure vessel 5 by opening a valve 21. In the normal state, the valve 21 prevents gas from flowing out via the connection 5h of the pressure vessel 5.

Any leakage, which can occur at any position of the pressure vessel 5 or one of the other pressurised components of the device, is symbolically represented by a hole L in the wall of the pressure vessel 5. A gas loss flow GV escapes by way of hole L, leading to a drop in pressure in the pressure vessel 5.

A pressure measuring cell 22 is provided for registering any drop in pressure in the pressure vessel 5, said pressure measuring cell 22 being connected to the connection 5h. The pressure measuring cell 22 also feeds the measuring signal generated by it to the evaluation and control device 16.

The melt process in the pressure vessel 5 is carried out in an atmosphere containing a partial nitrogen pressure of $P_{N2, \, target}$. This corresponds to the desired value to be attained of the Sieverts constant $K_s$ for the alloy at working temperature:

$$P_{N2,target} = P_O * \left(\frac{[\% \, N]_{target}}{K_S}\right)^2 \quad (1)$$

In equation (1) the Sieverts constant directly relates to nitrogen solubility at standard pressure in mass per cent: However, nitrogen can also be fed to the molten metal M by adding nitrogen-containing additives Z from a reservoir 23 via a screw-type conveyor 24 driven by a servo motor or another conveyor mechanism with a sluice function. Normally, the additive Z is added to the pressure vessel 5 as a granulate, which e.g. may also contain other alloying elements as well as deoxidation and desulphuration agents. This additional option of adding nitrogen by alloying is important in the interest of shortening the duration of treatment, if the slag S contained in the pressure vessel 5 impedes the transfer of the nitrogen from the atmosphere contained in pressure vessel 5 to the liquid metal phase M in the direction of the arrow P.

With the state of the art, in the case of a negative pressure deviation in a pressure melting plant, to maintain the pressure, gas is fed in until the working pressure is reached again. By contrast, in the device according to the invention, shown in FIG. 1, the volume of the nitrogen supplied is registered so as to be able to make an exact assessment of the quantity of nitrogen in the plant.

According to the invention it is possible in principle, without any special measuring device such as the flow meters 15 and 20, to determine the added quantity of nitrogen and argon. In such a case, in the example shown in FIG. 1, only valves 13 and 18 are present. When the valve 13 or 18 is temporarily opened, nitrogen or argon is supplied directly to the pressure vessel 5. The resulting temporary rise in pressure is registered by the pressure measuring cell 22. Since the volume $V_S$ of the vessel and the mean gas temperature are known, the increase in pressure can subsequently be converted directly to a respective normal addition volume of nitrogen or argon. However, this approach is associated with a disadvantage in that it is inaccurate because the calculation of the volume added is unfavourably influenced by the large volume of the plant, the relatively small changes in pressure and the measured deviation of the gas temperature.

The quantities of nitrogen and/or argon to be added can be calculated from the change in the normal gas volumes in the pressure vessel. These changes manifest themselves not only in the pressure loss ΔP but also in the respective changes in the concentration of nitrogen and argon in the time interval monitored. If the hot volume of the gas atmosphere in the pressure vessel 5 is known, i.e. taking into account the interior volume $V_B$ of the vessel and the mean gas temperature T of the gas atmosphere in pressure vessel 5, changes in the normal gas volumes can be calculated precisely according to a real state equation or approximately according to the ideal gas law. Thus for example in this sense the following applies concerning the change in normal gas volume of the nitrogen within a period from state 1 to state 2:

$$\Delta V_{N2} = (P_{N2,2} * \{\% \, N_2\}_2 - P_{N2,1} * \{\% \, N_2\}_1) * \frac{273}{100 * P_n * T} \quad (2)$$

To determine the concentration of the gas components, the pressure vessel is additionally connected to a gas analyser 25, via the connection 5h. In the example explained, a process gas chromatograph is used in combination with a gas specimen sampling valve. The gas chromatograph is operated with a separation column packed with a molecular sieve, as well as with helium as a carrier gas, so that both nitrogen and argon can be measured via integration of the respective peaks. Optionally, in addition, the hydrogen concentration can also be determined from the chromatogram.

Since the nitrogen-argon mixture represents an almost binary gas system containing only small quantities of tertiary gases, the argon concentration can be calculated approximately from the nitrogen concentration, by setting it off against 100%, taking into account an empirically determined mean correction factor. From a point of view of thermodynamics this is sensible, because only the partial nitrogen pressure can influence the nitrogen concentration in the metal bath to a significant extent. Calculation of the changed normal volume in accordance with equation (2) requires knowledge of the mean representative gas temperature. Since the gas atmosphere enclosed in the pressure vessel comprises both hot regions near the surface of the melt S and cooler regions in the radiation shadow, the mean temperature refers to a mixing temperature which represents the correctly weighted temperature influence of all regions of the pressure vessel 5.

To determine this mean temperature, by means of a temperature sensor 26 for example in a location near the connection between the lower and the middle parts 5a and 5b of the pressure vessel 5, the respective temperature is registered and transmitted to the evaluation and control device 16. From the temperature measured at the location, said evaluation and control device 16, by means of an empirically determined correction function which reflects the effective temperature distribution within the pressure vessel, calculates the mean temperature of the gas atmosphere contained in the vessel 5.

An alternative to the above-mentioned determination of the mean temperature consists of temporarily letting an additional, known volume of argon into the vessel and measuring the resulting increase in pressure. With the respective transposition of the gas equation used, e.g. the equation (2) which approximately corresponds to the ideal gas law, the mean gas temperature can be calculated directly. With this approach there is no need for the temperature sensor 26.

If the normal volume of nitrogen in a gas-proof vessel decreases between point in time $t_1$ and point in time $t_2$, then this change corresponds to the nitrogen volume $\Delta V_{N2,Atm}$, which has entered the liquid metal phase as a result of material transfer from the atmosphere contained in the pressure vessel 5. The nitrogen content $[N\%]_{t2}$ of the metal melt at the end of the monitored time period is then calculated as follows $$[\% N]_{t2} = [\& N]_{t1} + \frac{m_Z * \frac{[\% N]_Z}{100} + \Delta V_{N2,Atm} * \frac{28}{22.4}}{m_{melt}} * 100 \quad (3)$$

where "$[\%N]_{t1}$" and "$[\%N]_{t2}$" denote the nitrogen concentrations in the metal bath at the start (point in time $t_1$) and at the end (point in time $t_2$) of the monitored time period; "$m_2$" denotes the added quantity and "$[\%N]_z$" denotes the nitrogen concentration of any added nitrogen-containing additives, and "$m_{Melt}$" describes the weight of the melt. The gas volume $\Delta V_{N2,Atm}$ which as indicated by arrow P has entered the melt bath via the materials transfer from the atmosphere, can however not simply be derived from the statement in equation (2) and the change in concentration of the nitrogen. This is due to the fact that the reduction in concentration can also be the result of gas losses caused by lack of tightness in the pressure system. This is an essential reason why in the processes applied up to now, as explained in the introduction of this application, it was not possible to calculate exactly the quantity of nitrogen dissolved in the bath.

Determining the gas loss of the device is thus an essential part of the inventive idea. This takes place in that between two points in time, the change in the argon mass contained in the vessel is determined by measuring the total pressure as well as evaluating the quantitative argon analysis. Since argon is not soluble in steel, a decrease of the mass contained in the atmosphere directly reflects the argon loss as a result of lack of tightness of the vessel or of the supply systems over this period of time. Of course any additions of argon $\Delta V_{Ar,Addition}$ have to be taken into account. In a first approximation in this context it can be assumed that the concurrent leakage loss $\Delta V_{N2,Loss}$ of nitrogen takes place according to the mean concentration ratio of the two gases within the time interval:

$$\Delta V_{N2,Loss} = \left[ \Delta V_{Ar,Addition} + (P_1 * \{\% Ar\}_1 - P_2 * \{\% Ar\}_2) * \frac{V_B * 273}{100 * P_0 * T} \right] * \frac{\{\% N_2\}_1 + \{\% N_2\}_2}{\{\% Ar\}_1 + \{\% Ar\}_2} \quad (4)$$

If this part of the nitrogen loss is known from equation (4), then any change in nitrogen mass beyond this can be determined as a result of the materials transfer between the melt and the gas atmosphere. This materials transfer can of course be either positive or negative, i.e. the atmosphere contained in the pressure vessel 5 supplies nitrogen or absorbs it from the melt, depending on whether its pressure is above or below the respective nitrogen activity of the melt. The nitrogen volume $\Delta V_{N2,Atm}$ which has reached the bath via materials transfer from the atmosphere contained in the pressure vessel 5, can be calculated according to equation (5) and can be inserted in equation (3) to determine the nitrogen content of the bath at a given time:

$$\Delta V_{N2,Atm} = \Delta V_{N2,Addition} - \Delta V_{N2,Loss} \quad (5)$$

By means of the approach according to the invention, the nitrogen pickup of the metal bath from the atmosphere can be stated at any time. This provides the possibility of operating with nitrogen pressures above the equilibrium pressure resulting from equation (1) according to Sieverts law. This not only leads to shortening of the nitriding duration but also to savings in nitrogen-releasing additives. To be sure, the partial nitrogen pressure at the time of attaining target value concentration in the melt must be brought back to the equilibrium pressure. However, this point in time can be precisely determined based on the approach described above.

Figure 2:
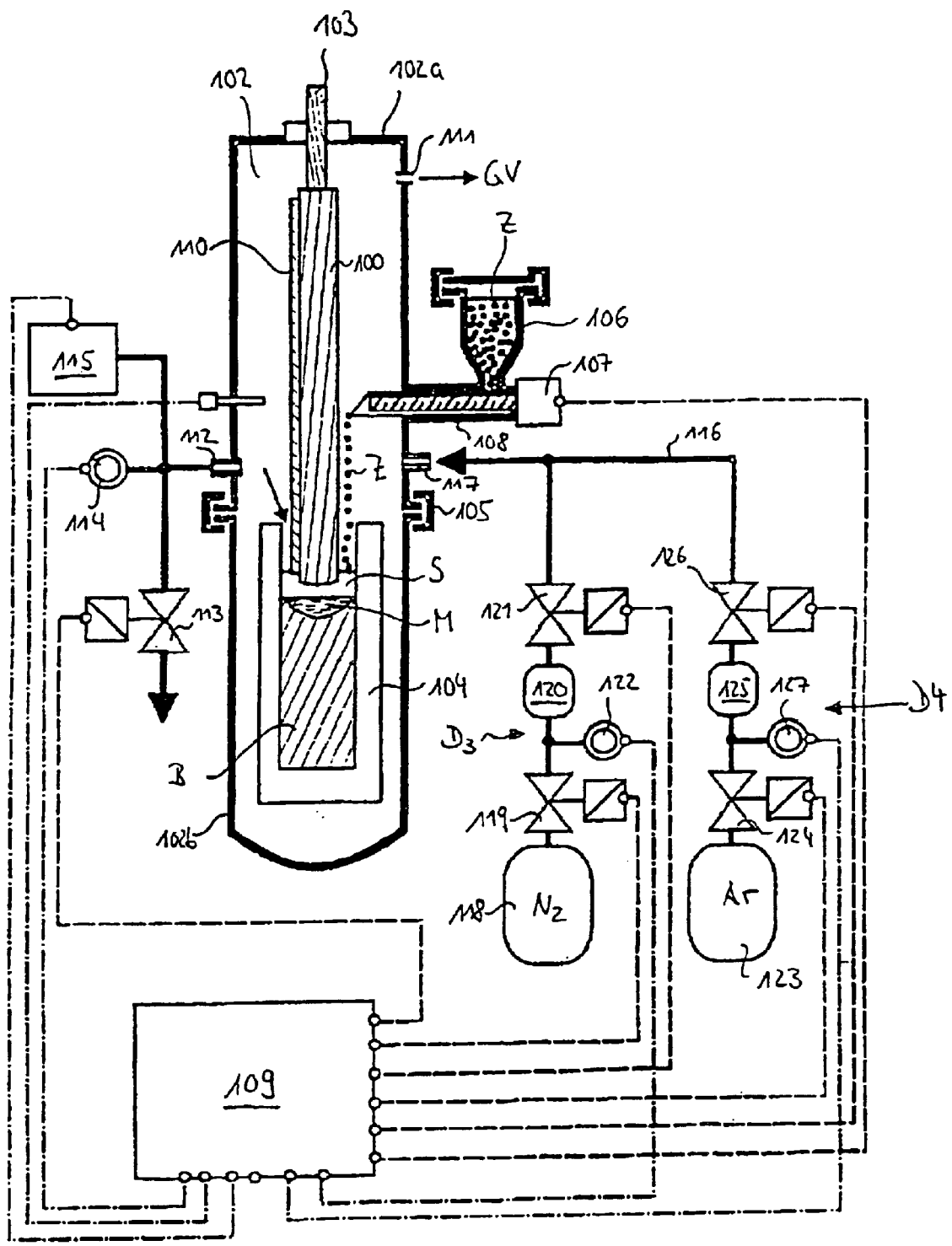
FIG. 2 a further device for controlling the nitrogen transfer during remelting of alloys comprising nitrogen in a pressure electroslag refining plant (DESU).

FIG. 2 shows another particularly interesting application example for using a device according to the invention. With such a device, a pressure electroslag refining process (DESU) can be carried out. Nowadays, the majority of highly nitrogenised steels are industrially produced according to this process. With all remelting methods, a small liquid stationary metal phase is present, which is small in comparison to the total remelting weight, said small liquid stationary metal phase having a very short passage time. For this reason as a rule it can be assumed that there is insufficient time for the liquid metal phase to establish an equilibrium with the gas phase.

In the device shown in FIG. 2 an electrode 100 made from a metal alloy to be nitrided, said electrode 100 being moved downward with a thrust rod 103 protruding through a seal 101 into the top part 102a of a pressure vessel 102, is remelted drop by drop as it contacts the highly heated slag S. Below the slag S, there is a stationary liquid metal phase M which continuously solidifies to an ingot B in a water-cooled permanent mould 104. The water-cooled permanent mould 104 is situated in a lower part 102b of the pressure vessel which by way of a flange with pressaround ring 105 is connected in a pressure-proof connection to the upper part 102a of the pressure vessel.

Furthermore, the device shown in FIG. 2 comprises a first reservoir 106, from which via a screw-type conveyor 108 driven by a servo motor 107, granulated additives Z which release nitrogen can be applied to the surface of the slag S. An evaluation and control unit 109 matches the temporal distribution, of the quantity of additives Z to be added, to the remelting performance of the device, at any given time.

According to the state of the art, the use of a composite electrode with a phase rich in nitrogen is however also possible. In FIG. 2 this alternative is indicated by a rod-shaped vessel 110 which contains nitrogen-releasing additives, said vessel 110 being attached at the side of the electrode 100, in the example shown. However, the use of a composite electrode of the type mentioned is associated with the disadvantage in that the quantity of the nitrogen-releasing additives cannot be varied during the remelting process.

The device shown in FIG. 2 also entails unavoidable instances of lack of tightness which are symbolically represented by an aperture 111 in the wall of the top part 102a of the pressure vessel. A gas volume flow GV is lost as a result of this lack of tightness.

In the device according to FIG. 2, the volume of nitrogen lost as a result of lack of tightness, can also be determined for a given monitored period in time, according to equations (4) and (6). However, the resulting nitrogen transfer from the atmosphere contained in the pressure vessel 102 to the liquid metal phase M, needs to be inserted in a modified mass balance (3a) analogous to equation (3). This is because in relation to the stationary metal bath, apart from the atmosphere and the quantity of nitrogen-containing additives that have been added, the electrode too must be taken into account, being the third supplier of nitrogen:

$$[\% N]_{t2} = [\% N]_{t1} + \frac{m_z * \frac{[\% N]_z}{100} + m_{EJ} * \frac{[\% N]_{EJ}}{100} + \Delta V_{N2,Atm} * \frac{28}{22,4}}{m_{Melt}} * 100 \qquad (3a)$$

In this example the quantity $m_{Melt}$ corresponds to the weight of the metal remelted in the time interval monitored.

As is the case of the device according to FIG. 1, the pressure vessel 102 comprises a connection 112, by way of which in the case of excess pressure, gas atmosphere can be released from the pressure vessel 102 by means of a valve 113. At the same time a pressure sensor 114 to register the total pressure present in the pressure vessel 102, as well as a gas analysis device 115, are connected to the connection 112. The gas analysis device 115 is an automatic quadrupole mass spectrometer. Apart from nitrogen content and argon content such a device also provides information on a number of other gases contained in the atmosphere of the pressure vessel 102, such as hydrogen and water vapour, which can be of interest for checking the hydrogen content in the melt. The measuring results from the pressure sensor 114 and the gas analysis device 115 are supplied to the evaluation and control device 109 which also controls the function of valve 113 via one of its control outputs.

Up to now we assumed that the partial pressure of the nitrogen exceeds the pressure for reaching the desired value content in the melt. If in a device according to the invention, operation is at too low a partial nitrogen pressure, as already mentioned above, then of course materials transfer in the opposite direction can take place. In this case the melt bath M loses nitrogen to the atmosphere contained in the vessel, with the sign of $\Delta V_{N2,Atm}$ changing. An increase in the total pressure in the time period monitored or an increase in the nitrogen concentration registered during gas analysis provides a pointer that this has occurred.

Again, these effects can be strongly magnified by any losses due to lack of tightness. Nevertheless, the method according to the invention makes it possible to calculate these occurrences in the same way, by way of the balance of the inert gas component.

In the example according to FIG. 2 the added gas volume of nitrogen and argon is added with great accuracy by means of two metering devices D3 and D4. The respective metering devices D3, D4 are connected to a further connection 117 of the pressure vessel 102 via a common connection line 116. The metering device D3 comprises a pressure reservoir 118, a controllable valve 119 for closing the pressure reservoir 118, a metering reservoir 120, a valve 121 for closing the metering reservoir 120 in relation to the connection pipe 116, as well as a pressure measuring cell 122 which registers the pressure in the metering reservoir 120 and transmits it as a measuring signal to the evaluation and control device 109. The control inputs of the valves 119 and 121 are also connected to the evaluation and control device 109.

In order to convey nitrogen from the pressure reservoir 118 to the pressure vessel 102, first the valve 119 is opened while the valve 120 is in its closed position, so that nitrogen gas flows into the metering reservoir 120. After a certain time the valve 119 is then closed and the pressure attained in the metering reservoir 120 is registered by means of the pressure measuring cell 122.

After the valve 121 has been opened, the nitrogen can flow out into the pressure vessel 102 via the line 116. After the valve 121 has been closed, the pressure in the metering reservoir 120 is measured again. From the pressure difference, the quantity of nitrogen let into the pressure vessel is determined with excellent accuracy, taking into account the metering volume and if necessary by additionally measuring the temperature.

The metering device D4 is designed in the same way, with an inert gas, preferably argon, being able to be metered to the atmosphere in the pressure vessel 102. Thus the metering device D4 comprises a pressure vessel 123, a valve 124 closing off the pressure vessel 123, a metering reservoir 125, a valve 126 closing off the metering reservoir 125, and a pressure measuring cell 127 which registers the pressure existing in the metering reservoir 125. If the total pressure selected at the device is reached early, the valve 126 can be closed off early, before the metering reservoir is completely empty.

For controlling the remelting process it is of particular importance to mark the materials transfer conditions under which the nitrogen is transferred from the atmosphere to the melt bath. From the quasi-stationary conditions in the time interval monitored, the quantity of nitrogen transferred from the atmosphere to the bath is known. Apart from the present partial pressure $P_{actual}$ of the nitrogen, also known, from the total pressure P and the nitrogen concentration determined by gas analysis, is the actual content of nitrogen in the melt bath, according to equation (3a). In this way a materials transfer coefficient k for the quasi-stationary nitrogen transport in the time period monitored, can be calculated from the concentration gradient, according to a suitable materials transfer model. Both the slag S and the boundary surface of the metal phase M can be assumed to be impediments to materials transfer. In both cases, as an approximation a model with a stationary boundary layer can be used, e.g. according to Nemst-Brunner, i.e. there is convection within the slag and metal phases but in direct proximity of the phase boundary there are stagnating boundary layers on both sides, which can only be overcome by diffusion from the nitrogen. In such a case there is a formulation for the quantity of the transferring nitrogen $m_{N,Atm}$ according to the following equation (6):

$$m_{N,Atm} = \Delta V_{N2,Atm} * \frac{28}{22.4} = k * \frac{A}{V} * \Delta t * \left( K_S * \sqrt{\frac{P_{N2,actual}}{P_O}} - [\% \, N]_{actual} \right) \quad (6)$$

A denotes the area available for materials transfer; V the volume of the liquid metal bath M. If a change in the addition of nitrogen-releasing additives is to be changed, e.g. in the ideal case to be set to zero, then in the balance of equation (3a) there is a corresponding extra requirement for supplying nitrogen from the atmosphere, so as to achieve the desired value. This corresponds to a respective change of the transferring nitrogen volume and thus a changed value of the desired value of the partial nitrogen pressure. This partial nitrogen pressure can be calculated by using the materials transfer coefficient W determined by transposing equation (6), with said materials transfer coefficient W containing the area and volume of the geometric arrangement:

$$P_{N2,target} = \left( \frac{\frac{\Delta m_{N2,target}}{k' \Delta t} + [\% \, N]_{target}}{K_S} \right)^2 \quad (7)$$

In equation (7) the desired supply $P_{N2,target}$ of nitrogen, corresponding to a reduced quantity of nitrogen-containing additives together with the desired nitrogen content of the melt, can be specified. Taking into account the materials transfer coefficient W empirically calculated from the remelting process, as well as the Sieverts constant Ks for the alloy, the desired value partial pressure of the nitrogen, which pressure is necessary in this case, can then be calculated. If this pressure exceeds the operating temperature permissible for the device, which corresponds to the behaviour of a boundary layer of poor nitrogen permeability, then the remaining requirement must be covered from nitrogen-releasing additives.

The time interval for the above-mentioned monitoring must be selected at least such that in the context of measuring deviations of pressure, gas concentrations and temperature, significant changes with minimal errors result in the values to be determined. In practical applications, a time interval of 5–10 minutes has been shown to be suitable, i.e. as a rule, the nitrogen content calculated according to the method according to the invention corresponds to within ±0.02 m-% to the nitrogen content in the ingot, which content is subsequently actually determined by analysis.

In principle, the method according to the invention can be operated "manually" in cases where the process data required for implementing the method according to the invention (such as remelted quantity of steel, total pressure in the plant, concentration of the gasses, quantity of nitrogen-containing additives added, as well as the normal volumes of nitrogen and argon which in the time interval have been added) are available.

However, it is particularly advantageous if the evaluation and control processes are automated in that both the evaluation and the calculations necessary for controlling the device, are carried out by the evaluation and control device. At the same time, an evaluation and control device designed in this way can keep to certain specified operational practices or process management which have been optimised with regard to the respective metal alloy to be processed and with regard to the desired work result.

Such operational practice may consist of specifying to the control system a fixed quantity of nitrogen-releasing additives, whereupon said control system adjusts the pressure for the nitrogen content to be attained. A second operational practice may consist of the control system attempting to generate a desired value of the nitrogen content using a minimum quantity of nitrogen from nitrogen-releasing additives. The control system then calculates the maximum partial nitrogen pressure which may be operated within the permitted pressure range of the plant. If the calculated pressure is too high, then the control system selects the highest permissible pressure while covering the remaining nitrogen requirement from the quantity of nitrogen-releasing additives which are thus reduced to a minimum.

In all cases the essential advantage of the method according to the invention consists of the plant, starting with a given initial situation, and abiding by operational practice specified by the operator, being independently able to attain the ideal quasi-stationary final state in a short succession of steps which become increasingly more accurate. Any changes in operational parameters occurring during the remelting process are also registered and corrected by respective changes in the nitrogen concentration as well as in the quantity of additives which are added. By way of by-products, important characteristic quantities relating to process-technology, such as the nitrogen solubility of the alloy, the materials transfer coefficient under concrete operating conditions as well as ongoing diagnosis of the lack of tightness of the plant, are supplied. The data obtained in this way can be statistically evaluated and used for optimising the empirically determined calculation operands and correlations of the control program.

REFERENCE CHARACTERS

| FIG. 1 | |
| --- | --- |
| 3 | Induction crucible |
| 4 | Induction coil |
| 5 | Pressure vessel |
| 5a | Bottom part |
| 5b | Middle part |
| 5d | Partition wall |
| 5e | Central aperture |
| 5f | Top part |
| 5g, 5h | Connections |
| 6 | Pressaround ring |
| 7 | Valve plate |
| 8 | Movement mechanism |
| 9 | Actuator |
| 10 | Pressaround ring |
| 11 | Connection pipe |
| 12 | Pressure reservoir |
| 13 | Valve |
| 14 | Flow throttle |
| 15 | Mass flowmeter |
| 16 | Control device |
| 17 | Pressure vessel |
| 18 | Valve |
| 19 | Flow throttle |
| 20 | Mass flowmeter |
| 21 | Valve |
| 22 | Pressure measuring cell |
| 23 | Reservoir |
| 24 | Screw-type conveyor |
| 25 | Gas analyser |
| 26 | Temperature sensor |
| D1, D2 | Metering devices |
| GV | Gas loss flow |
| L | Hole |

-continued

FIG. 1

| | |
|---|---|
| M | Molten metal |
| P | Arrow |
| S | Slag |
| Z | Additive |

REFERENCE CHARACTERS

FIG. 2

| | |
|---|---|
| 100 | Electrode |
| 101 | Seal |
| 102a | Top part |
| 102 | Pressure vessel |
| 103 | Thrust rod |
| 104 | Permanent mould |
| 104 | Permanent mould |
| 102b | Pressure vessel component |
| 105 | Pressaround ring |
| 106 | Reservoir |
| 107 | Servo motor |
| 108 | Screw-type metering conveyor |
| 109 | Evaluation/control device |
| 110 | Vessel |
| 111 | Aperture |
| 112 | Connection |
| 113 | Valve |
| 114 | Pressure sensor |
| 115 | Gas analysing instrument |
| 116 | Connection pipe |
| 117 | Connection |
| 118 | Pressure reservoir |
| 119 | Valve |
| 120 | Metering reservoir |
| 121 | Valve |
| 122 | Pressure measuring cell |
| 123 | Pressure reservoir |
| 124 | Valve |
| 125 | Metering reservoir |
| 126 | Valve |
| 127 | Pressure measuring cell |
| B | Ingot |
| D3, D4 | Metering devices |
| GV | Gas volume flow |
| M | Metal phase |
| S | Slag |
| Z | Additives |

What is claimed is:

1. A method for producing a metal alloy, wherein a certain desired content of an alloying constituent is fed to said metal alloy in a vessel at overpressure, wherein said alloying constituent is gaseous in its normal state, said method comprising:

adding the alloying constituent as a gas and an inert gas to the atmosphere contained in the vessel in such quantities that a particular initial concentration ratio between the gaseous alloying constituent and the inert gas exists in the atmosphere of the vessel;

determining changes over time of total gas pressure, changes over times of the concentration of the inert gas and of the gaseous alloying constituent in the atmosphere contained in the vessel, and changes over time of the mean gas temperature of the atmosphere contained in the vessel;

determining the mass loss of the inert gas in the atmosphere of the vessel, said mass loss being due to lack of tightness of the vessel, taking into account the total gas pressure, the concentration of the inert gas, the concentration of the gaseous alloying constituent, and the mean gas temperature;

determining a theoretical mass loss of the gaseous alloying constituent in the atmosphere from the initial concentration ratio, said theoretical mass loss resulting from the lack of tightness of the vessel;

determining the mass fraction of the gaseous alloying constituent transferred into the metal alloy by comparing the theoretical mass loss with the actual mass loss of the gaseous alloying constituent, the actual mass loss of the gaseous alloying constituent being determined from the actual concentration of the gaseous alloying constituent in the vessel; and introducing the gaseous alloying constituent into the atmosphere of the vessel in such quantities and for such a period of time that the metal alloy has a desired content of the gaseous alloying constituent.

2. A method according to claim 1, further comprising maintaining the total pressure of the atmosphere and the partial pressure of the gaseous alloying constituent by a metered addition of the gaseous alloying constituent.

3. A method according to claim 1, further comprising adding by metering the inert gas into the atmosphere of the vessel in addition to the gaseous alloying constituent.

4. A method according to claim 1, wherein the metered addition of the gaseous alloying constituent takes place independently of the metered addition of the inert gas.

5. A method according to claim 1, wherein the metered addition of the gaseous alloying constituent takes place by means of solid particles, wherein said solid particles contain the gaseous alloying constituent in bound form, said solid particles releasing the gaseous alloying constituent at a known concentration when exposed to heat.

6. A method according to claim 1, further comprising:
measuring the temperature of the atmosphere contained in the vessel in at least in one location; and
determining the mean gas temperature on the basis of said measuring step taking into account a previously determined correlation between the temperature at the one location and the mean gas temperature.

7. A method according to claim 1, wherein the mean gas temperature is measured by means of a rise in pressure, said rise in pressure being triggered in the vessel by a temporary addition of a known inert gas volume.

8. A method according to claim 1, wherein the gaseous alloying constituent is nitrogen.

9. A method according to claim 1, wherein the inert gas is argon.

10. A method according to claim 1, wherein the metal alloy is a steel alloy.

11. A method according to claim 5, wherein the solid particles are added by metering in the form of a powder or a granulate.

12. A method according to claim 11, wherein the solid particles comprise a metal nitride or a metal carbonitride.

13. A method according to claim 12, wherein the solid particles comprise silicon nitride, chromium nitride, manganese nitride, lime-nitrogen, or combinations thereof.

14. A method according to claim 1, further comprising placing the metal alloy in the vessel in solid form, and performing a remelting process of said metal alloy in the vessel.

15. A method according to claim 14, further comprising performing the remelting process as an electroarc refining process or as an electroslag refining process.

16. A method according to claim 14, further comprising registering the volume of the metal alloy remelted per unit of time and determining a quantity of the gaseous alloying constituent to be added by metering taking in account said volume of said remelted metal alloy.

17. A device for implementing the method according to claim 1, said device comprising:
- a vessel which contains an atmosphere and a metal alloy at overpressure;
- a heating device which generates a melt from the metal alloy;
- a first metering device which feeds an alloying constituent into the vessel, said alloying constituent being gaseous in its normal state;
- a second metering device which feeds an inert gas into the vessel;
- a pressure sensor which registers a total pressure of the atmosphere contained in the vessel;
- a temperature sensor which registers the temperature of the atmosphere in the vessel in at least one location;
- a concentration-measuring device which determines concentrations of the inert gas and of the gaseous alloying constituent in the atmosphere contained in the vessel;
- an evaluation unit which evaluates the total pressure, the temperature of the atmosphere and the concentrations of the inert gas and of the gaseous alloying constituent; and
- a control device which controls the feeding of the inert gas and of the gaseous alloying constituent into the vessel based upon the evaluation of the evaluation unit.

18. A device according to claim 17, further comprising a valve, wherein said valve releases the atmosphere contained in the vessel.

19. A device according to claim 17, wherein the heating device comprises an induction furnace or an electric arc furnace.

20. A device according to claim 17, further comprising a third metering device which feeds solid particles into the vessel.

21. A device according to claim 17, further comprising a measuring device which measures volumes of melted metal alloy in the vessel, wherein during the evaluation, the evaluating unit takes into account the measured volumes of the melted metal alloy.

22. A device according to claim 17, further comprising a device for registering amounts of particles fed into the vessel by the third metering device, wherein during the evaluation, the evaluation unit takes into account the amount of particles fed into the vessel.

* * * * *